March 20, 1962     D. J. ARNOLD ETAL     3,025,986
SIDE SHIFTING LOAD CARRIER

Filed April 27, 1959     6 Sheets-Sheet 1

ROWLAND L. SYLVESTER
DELEVAN J. ARNOLD
                    INVENTORS.
BY

*Eugene C. Knoblock*

ATTORNEY

March 20, 1962 D. J. ARNOLD ETAL 3,025,986
SIDE SHIFTING LOAD CARRIER
Filed April 27, 1959 6 Sheets-Sheet 2

ROWLAND L. SYLVESTER
DELEVAN J. ARNOLD
INVENTORS.

BY
Eugene C. Knoblock
ATTORNEY

March 20, 1962 D. J. ARNOLD ETAL 3,025,986
SIDE SHIFTING LOAD CARRIER
Filed April 27, 1959 6 Sheets-Sheet 4

ROWLAND L. SYLVESTER
DELEVAN J. ARNOLD
INVENTORS.

BY
Eugene C. Knoblock
ATTORNEY

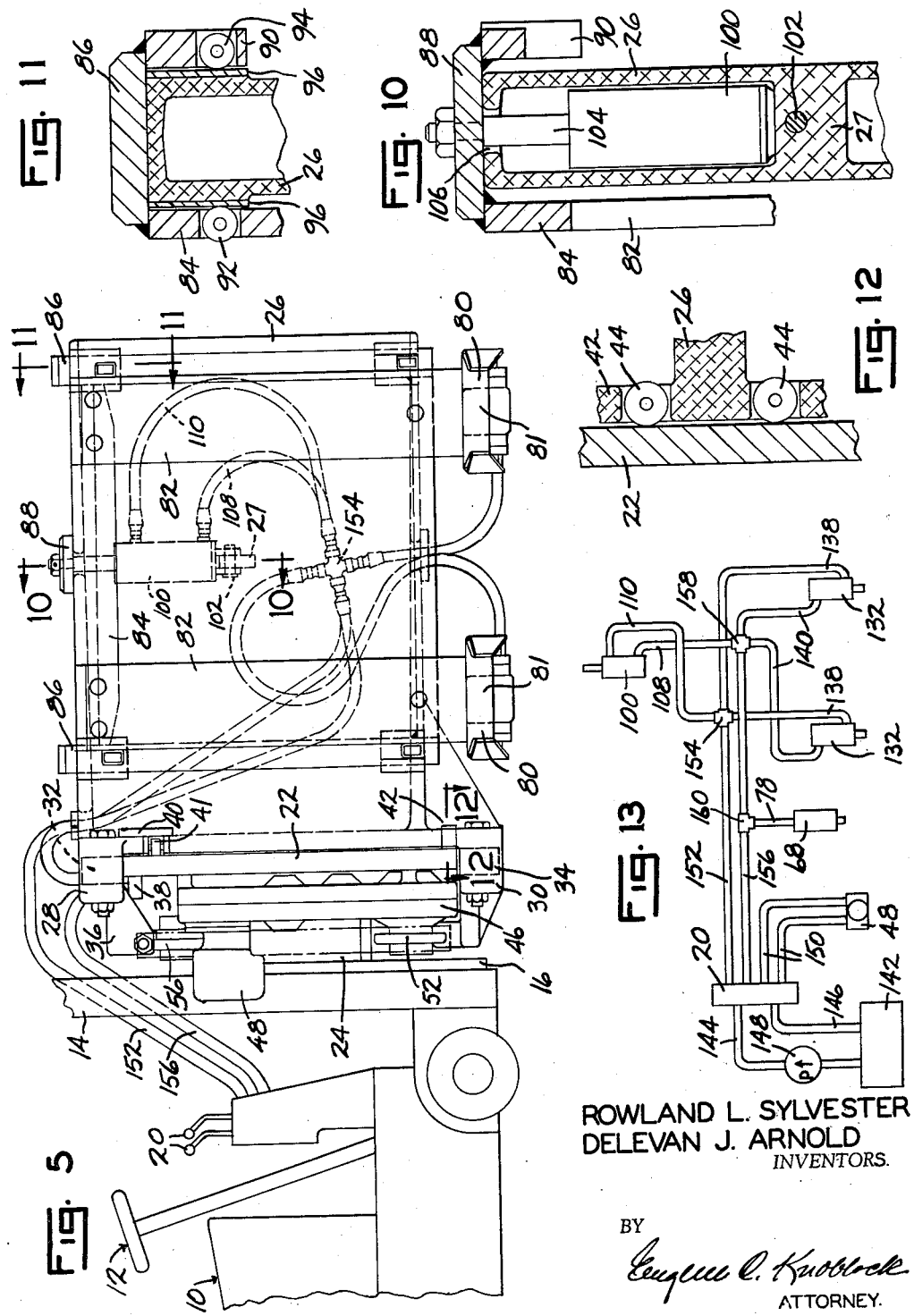

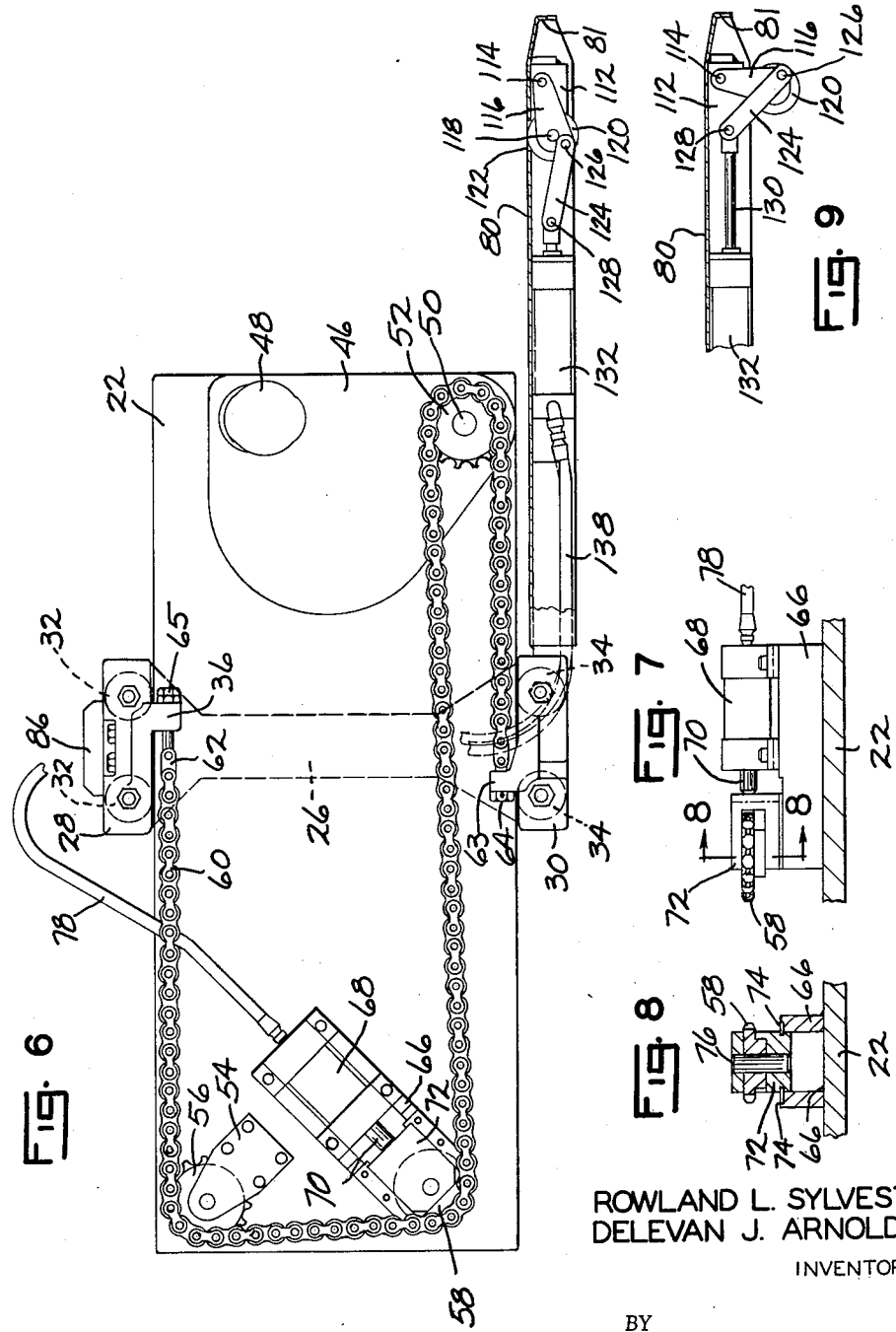

United States Patent Office 3,025,986
Patented Mar. 20, 1962

3,025,986
SIDE SHIFTING LOAD CARRIER
Delevan J. Arnold, Kalamazoo, Mich., and Rowland L. Sylvester, Mishawaka, Ind., assignors to Rack Specialists, Inc., South Bend, Ind., a corporation of Indiana
Filed Apr. 27, 1959, Ser. No. 809,026
8 Claims. (Cl. 214—731)

This invention relates to improvements in side shifting load carriers. Examples of devices upon which the present invention constitutes an improvement are shown in the Sylvester and Romine Pat. No. 2,804,218, dated August 27, 1957, the patent application of Robert E. Coash and Alonzo B. Kendall for Load Shifting Device, Serial No. 478,836, filed December 30, 1954, and the patent application of Rowland L. Sylvester and Theodore M. Arnold for Side Loading Transfer Device, Serial No. 671,930, filed July 3, 1957, now Patent No. 2,941,686.

The primary object of this invention is to provide a device of this character adapted to be mounted upon a load-carrying apparatus and which is of minimum weight and adequate strength to minimize the portion of the load-carrying capacity of the load-carrying apparatus which is required to sustain the weight of the device, and to make available the greatest possible part of the capacity of the load-carrying apparatus for the support of a load.

A further object is to provide a device of this character which is simple in construction, compact, strong, wherein operating parts are readily accessible for repair and replacement, and which has a minimum projection or spacing of its load-carrying center from the load-carrying apparatus upon which it is mounted in cantilevered relation.

A further object is to provide a device of this character having an elongated flexible member anchored at its ends to a frame and trained around and traversing rotatable guide members and a drive member mounted upon a carrier for shifting said carrier on the frame, with pressure actuated means for tensioning said flexible member responsive to the load applied to said carrier.

A further object is to provide a device of this character having a frame, a carrier traversing said frame, a cantilevered load-supporting unit shiftable vertically on said carrier, retractable wheels on the free ends of said cantilevered unit, and means for shifting said carrier on said frame including an elongated flexible member anchored at its ends to said frame and trained around guides and a driving member on the carrier, wherein said load-supporting unit and wheels are positioned in load-supporting position by fluid pressure actuating means and said flexible member is tensioned by fluid pressure actuated means, and all of said fluid pressure actuated means are interconnected and subject to a fluid pressure proportional to the load on the load-supporting unit.

Other objects will be apparent from the following specification.

In the drawings:

FIG. 5 is a view of the device in side elevation;

FIG. 6 is a rear view of the device as viewed from the bottom in FIG. 4;

FIG. 7 is a side view of the chain tightening device illustrated in FIG. 6;

FIG. 8 is a fragmentary detail sectional view taken on line 8—8 of FIG. 7;

FIG. 9 is a longitudinal fragmentary detail sectional view taken on line 9—9 of FIG. 4, with the fork-carried supporting wheel lowered;

FIG. 10 is a fragmentary detail sectional view taken on line 10—10 of FIG. 5;

FIG. 11 is a fragmentary detail sectional view taken on line 11—11 of FIG. 5;

FIG. 12 is a fragmentary detail sectional view taken on line 12—12 of FIG. 5; and FIG. 13 is a schematic view of a hydraulic circuit used in the device.

Figure 1:
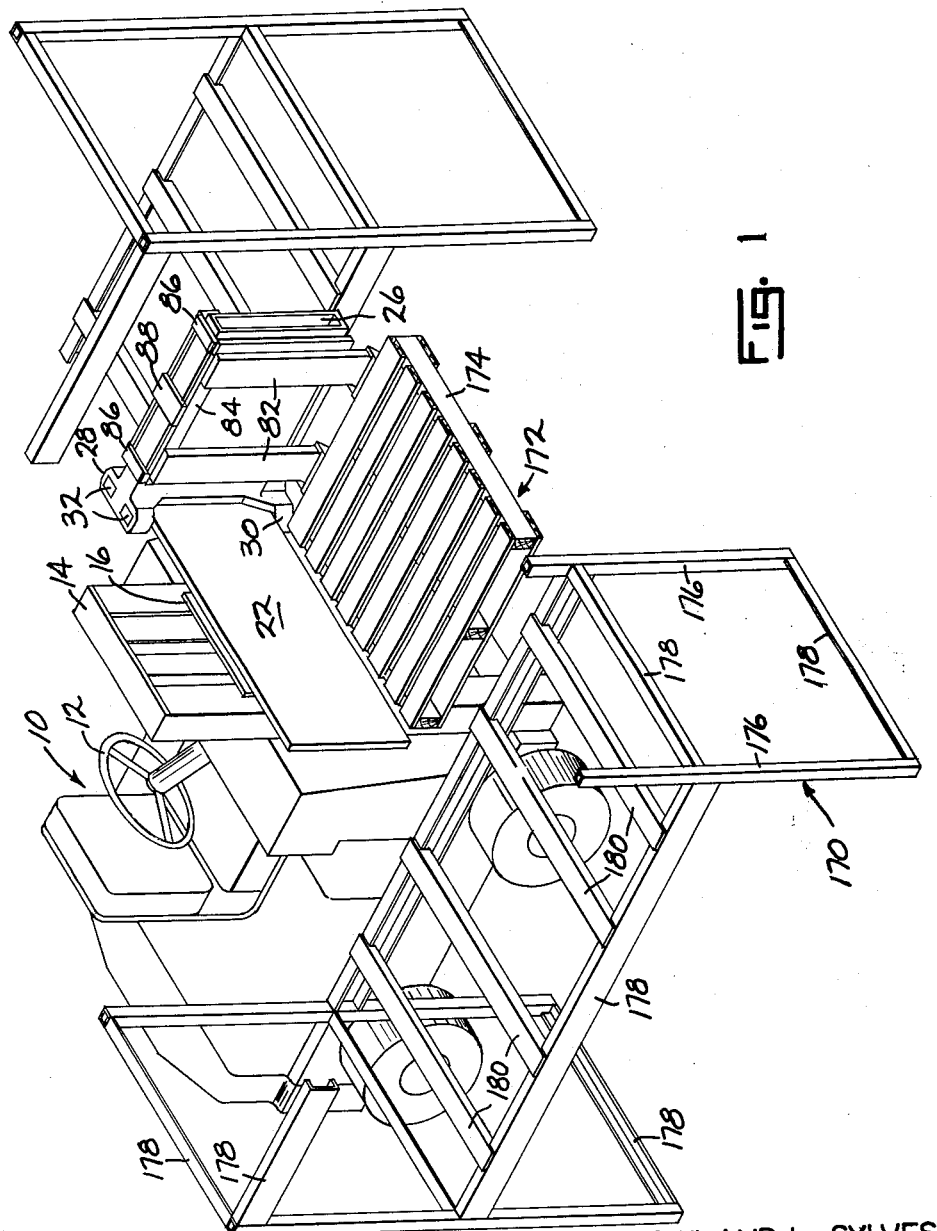
FIG. 1 is a perspective view of the device mounted upon a load-supporting apparatus in normal traveling position to move in aisles between storage racks.

Referring to the drawings which illustrate the preferred embodiment of the invention, the numeral 10 designates load-carrying apparatus, here illustrated as a vehicle of the power-operated dirigible type provided with steering means 12 and vertical ways, such as a mast structure 14, adapted to be vertically traversed by a member 16 whose position upon the mast 14 is controlled by power-operated means 18. Suitable controls 20 are provided to accommodate actuation of the various power driven means of the device, including the power member 18. While the vehicle 10 has been illustrated as a counter-balanced fork lift truck, it will be understood that the invention is not limited to application to or mounting upon a vehicle of this type, and that the device may be applied to other types of wheel-supported vehicles or to vehicles mounted on and traversing overhead tracks.

The side-shifting load-carrier has a mounting member, such as a rigid plate 22 or other structure, preferably rectangular and having parallel top and bottom edges. A rigid mounting bracket 24 is fixedly secured to the back of the mounting member 22 and provides means for fixedly securing the member 22 to the vertically shiftable member 16 on the mast 14, with its top and bottom edges horizontally positioned.

A fork-carrying unit is mounted upon the support member 22 to project forwardly therefrom and to traverse the same. This carrier unit preferably includes a rigid metal member, such as a casting 26, which preferably is hollow in part and which is of generally rectangular outline or shape and extends in a plane substantially perpendicular to the plane of the mounting member 22 and is oriented substantially vertically. At one end the carrier member 26 has top projection 28 and bottom projection 30 which extend endwise therefrom and transversely relative to the top and bottom edges of the mounting member 22. Rollers 32 are carried by the top projection 28 and travel on the top edge of the mounting member 22, and rollers 34 are carried by the bottom projection 30 and travel along the bottom edge of the mounting member 22. An ear or part 36 depends from the top projection 28 and provides means carrying one or more rollers 38 engaging the rear face of the mounting member 22. A bracket 40 may be provided on the carrier member 26 adjacent the front face of the mounting member 22 to provide means for journaling one or more rollers 41 traversing the front surface of the mounting member 22 adjacent the upper end thereof. The carrier member 26 preferably has bracket projection 42 adjacent the end projection 30 and journaling one or more rollers 44 traversing the front or outer face of the lower margin of the mounting member 22. The rollers 32, 34, 38, 41 and 44 are so positioned as to provide for movement of the carrier member 26 along the mounting member 22 while maintaining its upright position and in such a manner as to prevent binding of the parts when subjected to or supporting heavy loads.

A speed-reducing drive-transmitting unit 46 is housed within a suitable casing fixedly mounted at the rear face of the mounting member 22. The housing of the speed reducer 46 mounts a drive motor 48 which preferably is a hydraulic motor but which may be of any other type desired. The output shaft 50 of the speed reducer 46 mounts a drive sprocket 52. The shaft 50 and sprocket 52 will preferably be located adjacent one lower corner of the mounting member 22. A bracket 54 is carried by the mounting member 22 adjacent the opposite upper corner of the mounting member 22 and serves to journal the shaft of a sprocket member 56. A third sprocket 58 is located adjacent the lower margin of the mounting member 22 below the sprocket 56. A chain 60 has one end 62 thereof anchored fixedly to the upper projecting part 36 of the frame 26 of the carrier unit by any suitable means. A run of the chain 60 extends from anchor 36, 62 to the sprocket 56 on which the chain is trained. Thence another run of the chain 60 extends downwardly from sprocket 56 to the sprocket 58 on which the chain is trained. Thence another run of the chain 60 extends substantially horizontally or lengthwise of a mounting member 22 to the sprocket 52 around which the chain is trained, and finally a run at the other end of the chain 60 extends to a projection 63 carried by the lower part 30 of the frame 26 of the carrier unit at which it is anchored by securing means 64. A tightening nut 65 may be screw-threaded upon the anchor member 62 to take up any slack in the chain 60.

The idler sprocket 58 has load-responsive chain tightening means associated therewith for adjusting the position thereof. As shown, these means include bracket or support members 66 of elongated character extending substantially equiangularly to the two runs of the chain at opposite sides of the sprocket 58. A fluid pressure responsive member 68, such as a cylinder-piston unit, is fixedly mounted upon the inner or upper end of the support 66, and the piston thereof (not shown) has a piston rod or plunger 70 projecting therefrom and bearing upon a sprocket carrier 72 which slidably traverses longitudinal guide member 74 carried by the elongated supports 66. Carrier 72 journals the shaft 76 of the sprocket 58. An elongated flexible conduit 78 communicates with the fluid pressure responsive member 68 to supply actuating pressure thereto. The fluid pressure responsive member 68 will preferably be spring loaded to normally urge the sprocket 58 toward the chain, and also will preferably be of the single acting type to supply fluid pressure in the same direction in which the spring acts.

The device is provided with a pair of rigid load-carrying fork members 80 which extend in spaced parallel substantially horizontal position projecting from the lower ends of substantially upright fork carrier arms 82. The upright arms 82 are interconnected by a fork carrier head which may include a yoke plate 84, a plurality of spaced top plates 86 and 88, respectively, extending transversely and across the frame 26 of the traverse unit, and a depending plate or bracket 90 extending alongside the upper part of the frame 26 of the traverse unit at the face thereof opposite that confronted by the member 84. The fork carrier parts 84 and 90 will be apertured, and rollers 92 are journaled by the parts 84, and rollers 94 are journaled by the parts 90. The frame 26 of the carrier unit will be provided with flat roller traversing surfaces at the portions thereof engaged by the rollers 92 and 94. These surfaces may constitute parts of wear plates 96. In the event the frame 26 of the carrier unit constitutes a casting of aluminum alloy, as is desirable to hold the weight thereof at a minimum, the wear plates 96 will preferably be formed of stainless steel. It will be observed that in the normal relation of the parts, the members 86 and 88 bear upon the top of the frame 26 of the carrier unit so that the weight of the forks and the load carried thereby is suspended therefrom and the position of the forks is stabilized by the rollers 92 and 94. If desired, additional rollers may be carried by the upright parts 82 of the frame of the fork units to engage the carrier frame 26 adjacent the lower part thereof, and thus further stabilize and position the forks.

As previously mentioned, the frame 26 of the carrier unit preferably constitutes a hollow casting. This casting may be provided with a cross-brace 27 substantially centrally thereof, as illustrated in FIGS. 5 and 10. A fluid pressure responsive member 100, such as a cylinder-piston unit, preferably has a pivotal connection at 102 at one end thereof with the frame-reinforcing member 27. The member 100 is preferably positioned within the cavity of the casting of the frame member 26 and is provided with a piston rod 104 projecting upwardly therefrom and through an opening 106 in the top of casting 26 for fixed connection at a reduced upper portion thereof with the part 88 of the fork assembly. A fluid pressure line or conduit 108 communicates with the lower part of the member 100, and a fluid pressure line 110 communicates with the upper part of the member 100. The conduits 108 and 110 preferably are flexible and extend through the cavity of the frame 26 of the carrier member.

Each of the forks 80 is preferably an inverted channel member, preferably having a tapered free end at least partially closed by an end plate 81. A pair of longitudinal reinforcing members 112 is mounted in the forks 80 and at their forward or free ends said members 112 mount a cross-shaft 114 which pivotally mounts bracket 116 mounting a cross-shaft 118 journaling a load-supporting roller 120 which normally is confined substantially within the outline of the fork arm 80. The upper wall of fork 80 may be provided with an aperture 122 to receive a part of said roller 120 when retracted, as illustrated in FIG. 6. A U-shaped bracket 124 preferably straddles roller pivoting bracket 116 and is pivotally connected thereto at 126 spaced from the roller journaling or mounting shaft 118. The opposite end of the bracket 124 is pivoted at 128 to the end of the piston rod 130 of a fluid pressure responsive member 132 confined within the outline of the fork and preferably pivotally connected at 134 to a plate or support 136 reinforcing and forming a part of fork 80. The fluid pressure responsive members 132 are preferably double acting cylinder piston members. A fluid presure conduit 138 is connected to the outer end of each power member 132, and a fluid pressure conduit 140 is connected to the inner end of each power member 132. The conduits 138 and 140 are preferably flexible and extend through the hollow fork arms, being suitably supported therein by clamps (not shown) or other means and thence extending into the hollow body of the carrier frame or unit.

The fork lift truck or other load-carrying apparatus will include a hydraulic system, and this system may be of the character illustrated in FIG. 13. The system may include a sump 142 from which conduits 144 and 146 extend to the control valve, such as the control 20. A power driven pump 148 is interposed in one of these lines, here shown as line 144. In the form shown diagrammatically in FIG. 13, the motor 48 is hydraulic and it is connected by conduits 150 with one part of the control valve 20. A conduit 152 connected with the control valve 20 is preferably flexible and leads to a branch fitting 154 which is positioned within the hollow carrier frame 26. Conduits 110 and 138 are connected to the fitting 154. Conduit 152 and conduits 110 and 138 may be considered low pressure conduits. A high pressure conduit 156 communicates with control valve 20 and has connected thereto a branch fitting 158 with which are connected, respectively, conduits 108 and 140. These constitute the high pressure conduits of the system. A branch fitting 160 is interposed in the line 156 and provides means for connecting conduit 78 leading to the chain-tightening fluid pressure responsive member 68. Thus it will be apparent that each of the fluid pressure responsive members 68, 100 and 132 is connected to the high pressure side of the circuit, and that each thereof is in free end and open communication with the others.

Figure 2:
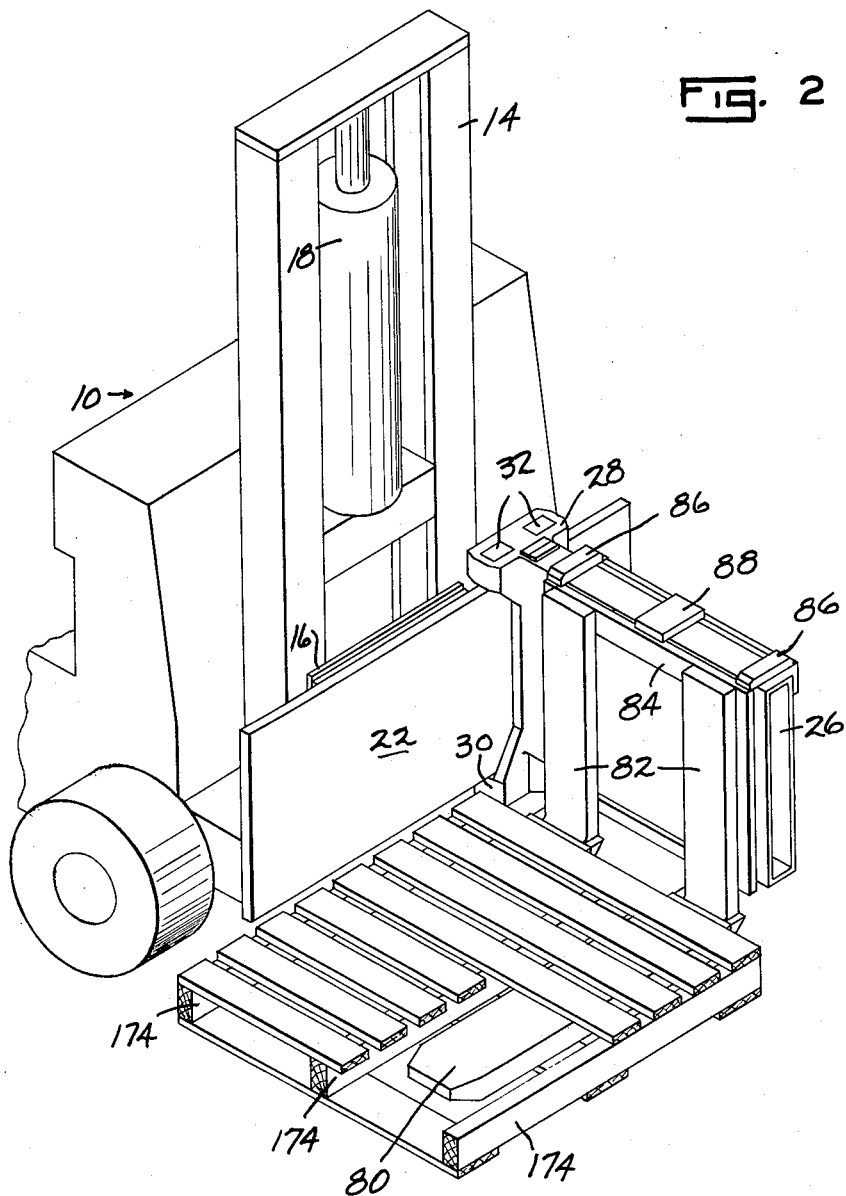
FIG. 2 is a perspective view of the device mounted upon a load-carrying apparatus and positioned slightly laterally offset from transport position.
Figure 3:
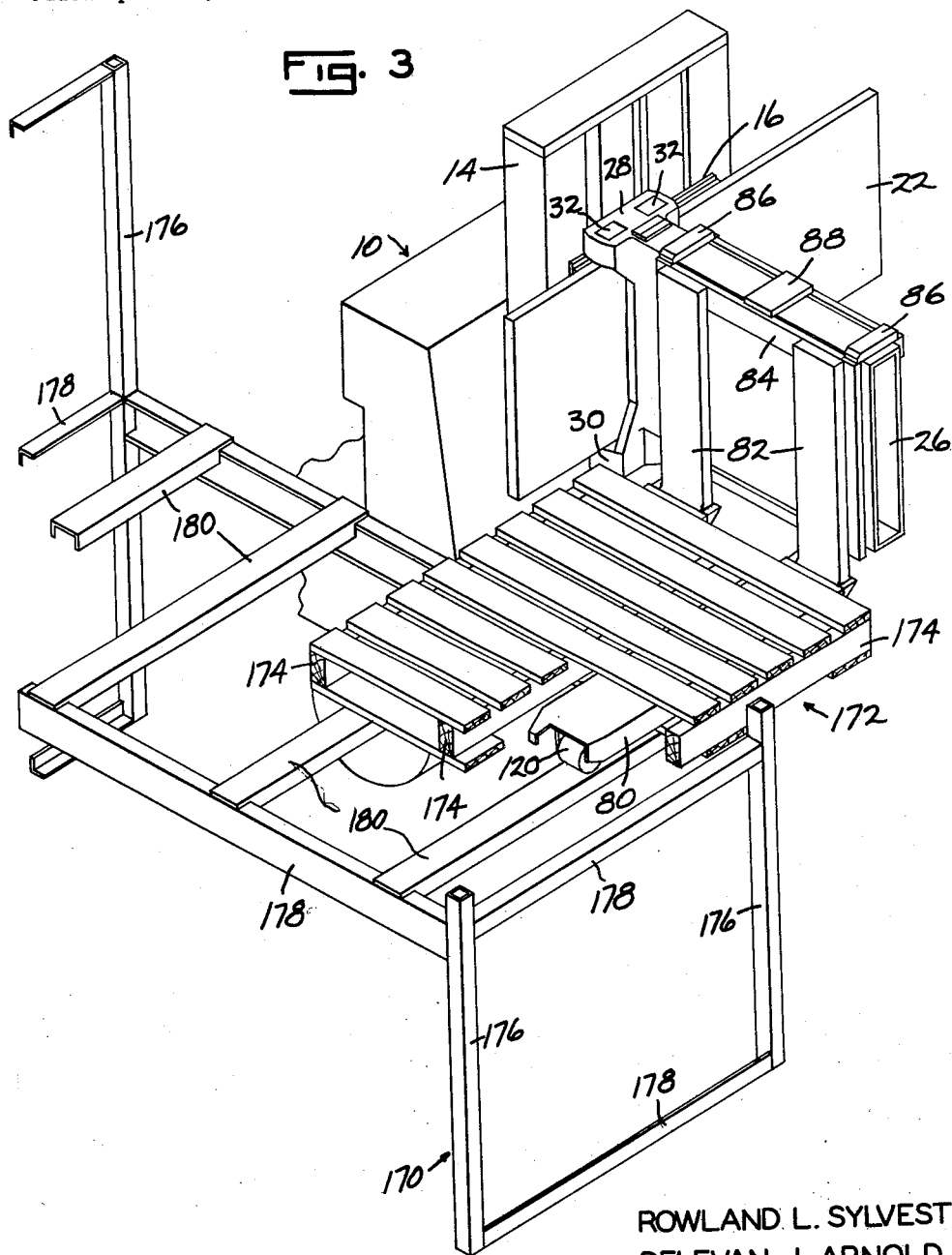
FIG. 3 is a perspective view of the device mounted upon load-carrying apparatus and projected laterally into a rack at a position intermediate its range of travel.
Figure 4:
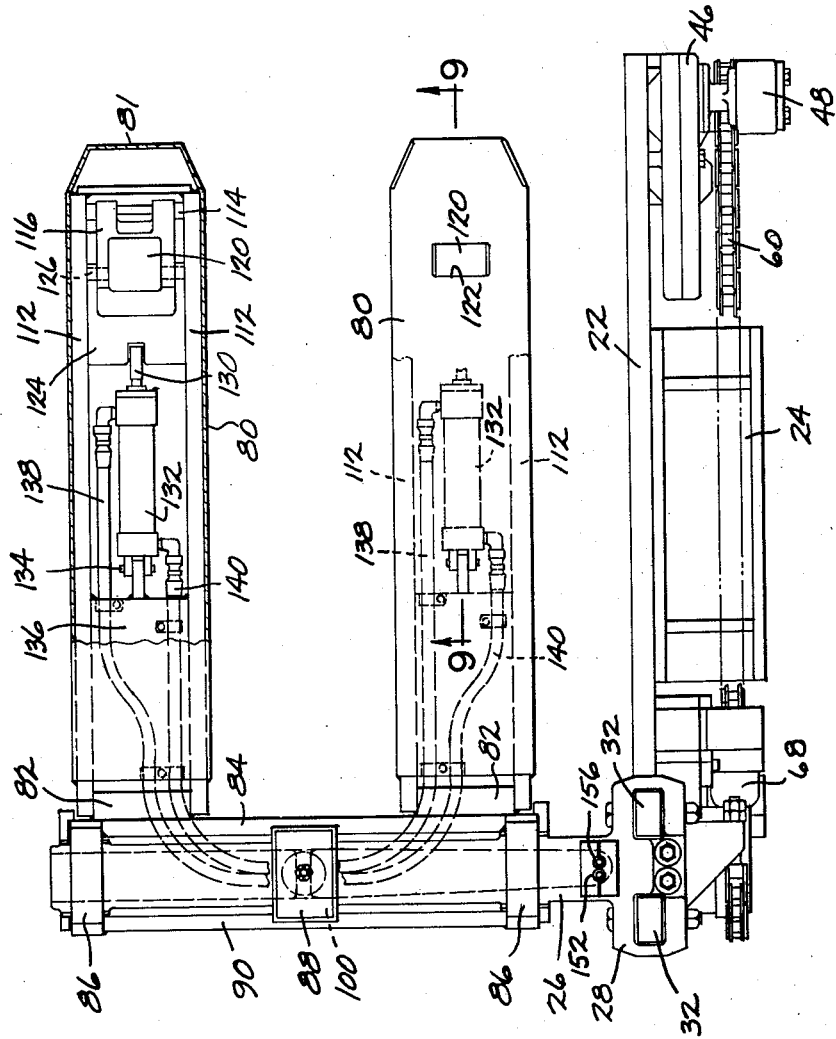
FIG. 4 is a top plan view of the device with parts shown in section.

The device is particularly intended for use in delivering to and removing from storage spaces of a selected storage rack 170 loads which are mounted upon load-carrying pallets 172 of any suitable construction and preferably characterized by a plurality of longitudinal frame members 174 between which the forks 80 are positioned as illustrated in FIGS. 2 and 3. The racks 170 will preferably include upright members 176 interconnected by horizontal frame members 178 and provided with a plurality of spaced horizontal structural members 180 adapted to support the pallets 172.

In the operation of the device, assuming that the side-shifting load carrier is mounted upon a fork lift truck or other load-carrying apparatus and that it is desired to remove a load-carrying pallet 172 from a storage rack or other storage position and to transport it to another location, the load-carrying apparatus is moved to position the side-shifting device alongside the load-bearing pallet. Mounting member 16 is then elevated or lowered to position the forks 80 at a proper elevation to enter the spaces between the parts 174 of the pallet. It will be understood that prior to loading, the load carrier will be in the position illustrated in FIG. 1 with the fork-carrying unit 26 thereof at one end of the mounting member 22, so that the forks 80 will be directly in front of the truck or other load-carrying apparatus. Thereupon the drive motor 48 is actuated by suitable manipulation of control 20 so as to rotate the sprocket 52 and cause the fork-carrying unit 26 to traverse the mounting member 22 in a direction to project the forks 80 laterally of the load-carrying apparatus and into the openings between the parts 174 of the pallet 172. It will be understood that the forks 80 will be located above the rack members 180 in substantially vertical register therewith when the pallet 172 is mounted in a storage rack.

The rollers 120 will be retracted during the extension of the forks 80 into the load-carrying pallet 172. When the fork-carrying unit reaches fully projected position the members 132 are actuated to shift the toggle defining members 116 and 124 in a direction to lower the rollers 120 as illustrated in FIG. 8. Simultaneously, the member 100 is actuated to elevate the forks relative to the fork carrier 26. These operations lift the pallet 172 from its support. Thereupon the motor 48 can be operated to shift the fork-carrying unit 26 toward its initial position so as to shift the pallet 172 and the load thereon to a position in substantial forward registration with the load-carrying apparatus. The load acting at the free ends of the carriers 80 or that part thereof which acts thereon is transmitted by the toggle mechanism 116, 124 and the rollers 120 to the rack. In this way lateral instability of the load-carrying apparatus during side shifting of the load between storage position and transport position forwardly centered relative to load-carrying apparatus is avoided through the major portion of such lateral travel. It will be apparent that by the time the rollers 120 reach the ends of the rack supports 180, the load will be substantially centered with the vehicle and the extent of lateral projection of the load during the final increment of movement to fully centered position will not be sufficient to unbalance the load-carrying apparatus laterally.

After mounting the load upon the apparatus in a centered transport position, as illustrated in FIG. 1, the load-carrying apparatus may be moved to a desired load discharge position, whereupon a reverse operation is performed. Specifically, the vehicle is stopped at a selected discharge position with the forks in register therewith laterally and with the roller wheels 120 on the forks lowered to the FIG. 9 position, and at such an elevation that they will contact the frame members 180 of the rack as soon as they have been projected a slight distance laterally by traversing of the fork-carrying unit 26 upon the mounting member 22. At this time the pallet 172 will be at a level clear of the rack and may move therein with the weight of the load carried thereby being carried partly by the load-carrying apparatus and partly by the rack part 180 on which the fork rollers 120 roll. When the fork arms have been fully projected so as to position the load at the desired point in the rack, the fork carried power members 132 are operated to extend toggle members 116 and 124 and thereby retract the roller 122 to the position illustrated in FIG. 6. This permits the pallet 172 to be lowered upon the rack incident to slight lowering of the forks bodily by release of fluid pressure in the fluid pressure member 100, whereupon the forks are released from their pallet supporting position and may be freely withdrawn from the pallet by movement of the fork-carrying unit in a proper direction on the mounting member 22.

It will be apparent from a consideration of the hydraulic circuit illustrated in FIG. 13 that the fork lifting power members 100 carried by the fork-carrying unit 26 are actuated simultaneously with the roller positioning power members 132 carried by the fork arms. In other words, the forks 80 are elevated simultaneously with lowering of the drop wheel 120 and the fork members 80 are lowered simultaneously with the elevation or retraction of the fork rollers 120. Also, it will be observed that the power member 68 which controls the position of the sprocket 58 meshing with the driving chain 60 functions simultaneously with the power members 100 and 132. Specifically, it will be observed that there is exerted upon the slidable sprocket 58 a chain tightening force by the member 68, which force is proportional to the force exerted by members 100 and 132 incident to lifting of a load upon the fork arms. This results in automatic tightening of the chain 60 in proportion to stresses acting thereon under load, and thereby insures that the drive mechanism will remain in operative condition at all times under load. This is particularly important in the present arrangement where the ends of the chain are attached to the shiftable fork-carrying unit 26, so that the chain changes its bodily position relative to the mounting member as the forks are projected laterally from one extreme to another. By this means a smooth and positive operation of the device occurs at all times regardless of the amount and nature of the load imposed upon the device, and all danger of binding of the parts is eliminated. This arrangement is particularly critical and important in the functioning of the device at the time at which the rollers 120 leave their support 180 incident to movement of the forks under load from a rack to a transport position. The last few inches of this movement must occur with entire support of the forks by the fork carrier 26 and the mounting member 22, whereas previously a part of this stress had been sustained by the racks 170 at the point of contact of the roller 210 therewith. The proportional stressing of the chain tightener at 58 to the stress acting upon the power member 100 at the instant of transition from two-point to one-point support, as described above, functions satisfactorily and avoids difficulties which might otherwise be encountered.

While the preferred embodiment of the invention has been illustrated and described, it will be understood that changes in the construction may be made within the scope of the appended claims without departing from the spirit of the invention.

We claim:
1. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for elevating and lowering said fork members on said carrier, a wheel carried by the free end of each fork and having a retracted position and a depending load-supporting position, means for selectively positioning said wheels, means for selectively positioning said fork carrier on said mounting member and including a tensioning member, and means responsive to operation of said wheel positioning means and said fork elevating means for actuating said tensioning member with a force proportional to the force exerted by said wheel positioning means and fork elevating means when under load.

2. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for shifting said fork members relative to said carrier between loaded and unloaded positions, means for selectively positioning said fork carrier on said mounting member and including a tensioning member, and means responsive to shifting of said fork members to loaded position for actuating said tensioning member with a force proportional to the load sustaining force exerted by said fork member.

3. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for shifting the fork members vertically on said carrier, a wheel carried by the free end of each fork and having a retracted position and a depending load-supporting position, means for selectively positioning said wheels, said wheel positioning means and fork positioning means being operable simultaneously and in correlation, means for selectively positioning said fork carrier on said mounting member and including a tensioning member, and means responsive to actuation of said wheel positioning means and fork positioning means to load supporting position for actuating said tensioning means proportionally to the loading of said fork members.

4. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for elevating and lowering said fork members on said carrier, a wheel carried by the free end of each fork and having a retracted position and a depending load-supporting position, means for selectively positioning said wheels and simultaneously and correlatively actuating said fork elevating means, means for selectively positioning said fork carrier on said mounting member and including a tensioning member, each of said fork-elevating means, wheel-positioning means and tensioning member including a pressure responsive actuating member, said pressure responsive actuating members being connected to a common pressure source and having pressure-equalizing communication with each other whereby the force exerted by said tensioning member is proportional to the force exerted by said fork-elevating means and wheel-positioning means when under load.

5. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for shifting said fork members relative to said carrier between loaded and unloaded positions, means for selectively positioning said fork carrier on said mounting member and including a tensioning member, and means responsive to movement of said fork members on said carrier to loaded position for actuating said tensioning member, said fork-shifting means and the means for actuating said tensioning member including fluid pressure members connected with a common pressure source and in free communication with each for exertion of proportional force by said tensioning member and fork shifting means under load.

6. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, a wheel carried by the free end of each fork and having a retracted position and a depending load-supporting position, means for selectively positioning said wheels, means for selectively positioning said fork carried on said mounting member and including a tensioning member, and means responsive to the stress on said wheel positioning means for proportionally actuating said tensioning means, said wheel-positioning means and said tensioning member including fluid pressure members connected with a common pressure source and in free communication with each other.

7. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for elevating and lowering said fork members on said carrier, a wheel carried by the free end of each fork and having a retracted position and a depending load-supporting position, means for selectively positioning said wheels, means for selectively positioning said fork carrier on said mounting member and including a plurality of sprockets carried by said mounting member, means shiftably mounting one sprocket, a chain trained around said sprockets and connected at its ends to said fork carrier, and means responsive to and exerting a force proportional to the force exerted to effect elevation of said fork members on said carrier and lowering of said fork wheels for shifting said one sprocket in chain-tightening direction.

8. In combination, a mobile load-carrying apparatus having a vertically adjustable mounting member, a fork carrier shiftable on said mounting member transversely of said apparatus, load-carrying fork members mounted on said carrier and extending parallel to the movement of said carrier, means for elevating and lowering said fork members on said carrier, a wheel carried by the free end of each fork and having a retracted position and a depending load-supporting position, means for selectively positioning said wheels, means for selectively positioning said fork carrier on said mounting member and including a plurality of sprockets carried by said mounting member, fluid pressure responsive means shiftably mounting one sprocket, a chain trained around said sprockets and connected at its ends to said fork carrier, and means responsive to elevation of said fork members on said carrier and to lowering of said fork wheels for actuating said sprocket shifting means in chain-tightening direction with a force proportional to the force exerted to elevate said fork members and lower said fork wheels.

References Cited in the file of this patent

UNITED STATES PATENTS

| | | |
|---|---|---|
| 2,417,395 | Framhein | Mar. 11, 1947 |
| 2,588,037 | Orton | Mar. 4, 1952 |

FOREIGN PATENTS

| | | |
|---|---|---|
| 1,126,725 | France | Nov. 29, 1956 |